Patented July 22, 1941

2,249,987

UNITED STATES PATENT OFFICE 2,249,987

MANUFACTURE OF DERIVATIVES OF ARYL SUBSTITUTED MONO-OLEFINS

Herbert Muggleton Stanley, Tadworth, and John Blair Dymock, Tonbridge, England, assignors to The Distillers Company Limited, Edinburgh, Scotland, a British company No Drawing. Application August 1, 1938, Serial No. 222,532. In Great Britain August 9, 1937

5 Claims. (Cl. 260—671)

This invention relates to the manufacture of derivatives of aryl substituted mono-olefins. These substances serve as good plasticisers for polystyrene resins, particularly to induce flexibility in such resins. They may also find application in electrical insulation; for example because of their low power factor they may be employed in power cables insulated with paper impregnated with them.

According to the present invention the aforesaid substances are constituted by the lower saturated, or mixed saturated and unsaturated, products of polymerisation of pure hydrocarbon derivatives of monostyrene obtained by substitution in the aromatic nucleus or in the α-position of the unsaturated side chain.

Suitable catalysts for the production of these simple polymers are aqueous sulphuric acid of 70-90% concentration, and aromatic sulphonic acids, and alkyl hydrogen sulphates. The polymerisation is effected in vessels fitted with cooling coils and agitation gear, suitable polymerisation temperatures being 0°-40° C. depending on the desired products.

The hydrocarbon polymers obtained according to the present invention include the lower saturated or mixed saturated and unsaturated dimer, trimers and tetramers obtained by controlled polymerisation of monostyrenes substituted in the α-position of the vinyl side chain or in the aromatic nucleus (or both) by alkyl, aryl or aralkyl groups. As parent substances we include α-methylstyrene, p-methylstyrene, p-isopropylstyrene, unsymmetrical methyl-p-tolylethylene and unsymmetrical methyl-p-cumyl-ethylene, $(CH_3)_2.CH.C_6H_4.C(CH_3)=CH_2$ The invention is particularly applicable to α-methylstyrene.

It has been found that the polymers produced by the polymerisation of these hydrocarbons (suitably diluted with an inert solvent) by means of concentrated sulphuric acid are wholly saturated substances mostly solid at ordinary temperatures, which are probably hydrindene derivatives produced by cyclisation of the unsaturated dimers and trimers. Despite the most careful washing and purification of these saturated polymers produced under the influence of concentrated sulphuric acid (96%), we find that these substances have relatively high power factors and are unsuitable in electrical insulation. On the other hand, if polymerisation is effected not with concentrated sulphuric acid but with aqueous sulphuric acid of say, 80% concentration, or with certain aromatic sulphonic acids, the products consist mainly of saturated polymers admixed with smaller amounts of unsaturated polymers, and this mixture which is usually a viscous liquid, has excellent insulating characteristics and a very low power factor and good heat resistance. By prolonged contact of the polymerised hydrocarbon mixture with the 80% sulphuric acid catalyst, products which are predominantly saturated are obtained which have enormously superior electrical properties as compared with similar saturated products obtained under the influence of 96% sulphuric acid as catalyst. These findings are exemplified by the case of the polymers of α-methylstyrene. If this hydrocarbon is polymerised in the form of a 25-30% solution in benzene or petroleum ether by 96% sulphuric acid at about 10° C. the product, after washing with water and alkali and distilling, is a completely saturated product melting at 52° C. which probably has the constitution

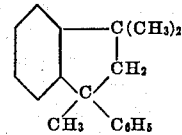

Even when carefully purified this product has a relatively high power factor, i. e. 0.015 at 17° C. and low frequency. In contradistinction the liquid polymer mixture of similar molecular weight obtained from α-methylstyrene under the influence of 80% sulphuric acid (or of certain aromatic sulphonic acids) have very much lower power factors. The following examples show how such products may be prepared.

Example I 1200 cc. of pure α-methylstyrene were added to a cooled agitated mixture of 100 cc. of petroleum ether having a boiling range of 40°-60° C. and 100 cc. of 80% aqueous sulphuric acid at such a rate that the temperature was maintained at 18°-23° C. After all the α-methylstyrene had been added, the stirring was continued at 20° C. for ½ hour and the product was washed with water and alkali, separated and dried, and the petroleum ether was removed under vacuum at about 150° C. The product was a pale yellow oil of mean molecular weight 240-250 and unsaturation corresponding to a content of 7% of the unsaturated dimer of α-methylstyrene. Its electrical properties were very good.

Example II

A catalyst was prepared by sulphonating 500 cc. of p-di-isopropylbenzene with 200 cc. of 97% sulphuric acid at 100° C. for 12 hours, allowing to settle for some time and separating off the lower acid layer. A mixture of 1300 cc. of α-methylstyrene and 450 cc. of petroleum ether having a boiling range of 40° to 60° C. was run slowly into 25 cc. of the above catalyst in a cooled glass vessel filled with efficient stirring device, and the temperature of the reaction mixture was maintained at about 20° C. throughout the addition. The product obtained by washing the crude reaction product with water and alkali, drying, and distilling off the petroleum ether, was a pale yellow oil of mean molecular weight 275 and an unsaturation corresponding to the presence of 10% of unsaturated dimeric α-methylstyrene. This material, obtained as quantitative yield based on the original α-methylstyrene employed, had a power factor of only 0.0002 at 17° C. and low frequencies.

Example III 1000 cc. of pure α-methylstyrene were introduced during the course of 2 hours, into a cooled agitated mixture of 50 cc. of dry benzene and 25 cc. of the sulphonated di-isopropylbenzene mixture prepared as described in Example II. During the addition the temperature was maintained at 11°–14° C. The product was a pale yellow viscous oil of mean molecular weight 280 and similar in electrical properties to the product obtained according to Example II.

Example IV 10 cc. of 80% aqueous sulphuric acid were added drop by drop to 500 cc. of well stirred and efficiently cooled pure α-methylstyrene. A rapid reaction took place with considerable heat evolution but the temperature was maintained below 30° C. by good cooling. At the end of the reaction (1 hour) the viscous product was diluted with petroleum ether, washed with water and alkali, dried, and finally heated to 150° C. under vacuum to remove the petroleum ether. The viscous oily product had a mean molecular weight of 340–350, an unsaturation corresponding to 20% of unsaturated trimeric α-methylstyrene and a power factor at 60° C. of only 0.0003 at low frequency.

Example V

The preparation was carried out exactly as in Example IV except that, instead of 10 cc. of 80% aqueous sulphuric acid, 5 cc. of the sulphonated di-isopropylbenzene catalyst (described in Example II) was used as catalyst and the temperature was maintained at 20°–30° C. The product had a mean molecular weight of 270 and was similar to the product obtained in Example III.

What we claim is:

1. The process for the manufacture of derivatives of aryl substituted mono-olefins which comprises polymerising a pure hydrocarbon derivative of monostyrene in which the substitution has occurred in the aromatic nucleus or in the α-position of the unsaturated side chain, using as catalyst a substance taken from the group consisting of aqueous sulphuric acid of from 70–90% concentration and sulphuric acids substituted by alkyl and sulphuric acids substituted by aryl, and maintaining a temperature ranging between 0° C. and 40° C., whereby products are obtained which impart very low power factor characteristics and enhanced insulating characteristics to electrical insulation impregnated therewith.

2. The process for the manufacture of derivatives of aryl substituted mono-olefins according to claim 1, in which the catalyst employed is aqueous sulphuric acid of from 70 to 90 per cent concentration.

3. The process for the manufacture of derivatives of aryl substituted mono-olefins according to claim 1, in which the catalyst employed is an aromatic sulphonic acid.

4. The process for the manufacture of derivatives of aryl substituted mono-olefins according to claim 1, in which the catalyst employed is an alkyl hydrogen sulphate.

5. The process for the manufacture of derivatives of aryl substituted mono-olefins according to claim 1 in which the pure hydrocarbon derivative of monostyrene subjected to the polymerisation is α-methylstyrene.

HERBERT MUGGLETON STANLEY.
JOHN BLAIR DYMOCK.